Jan. 5, 1954

G. H. CAMPION 2,664,902

CENTER SPRAY PORTABLE DISHWASHING MACHINE

Filed July 7, 1948

INVENTOR
George H. Campion

BY *Victor J. Evans & Co.*

ATTORNEYS

Jan. 5, 1954 G. H. CAMPION 2,664,902
CENTER SPRAY PORTABLE DISHWASHING MACHINE
Filed July 7, 1948 5 Sheets-Sheet 3

INVENTOR.
George H. Campion
BY Victor J. Evans & Co.
ATTORNEYS

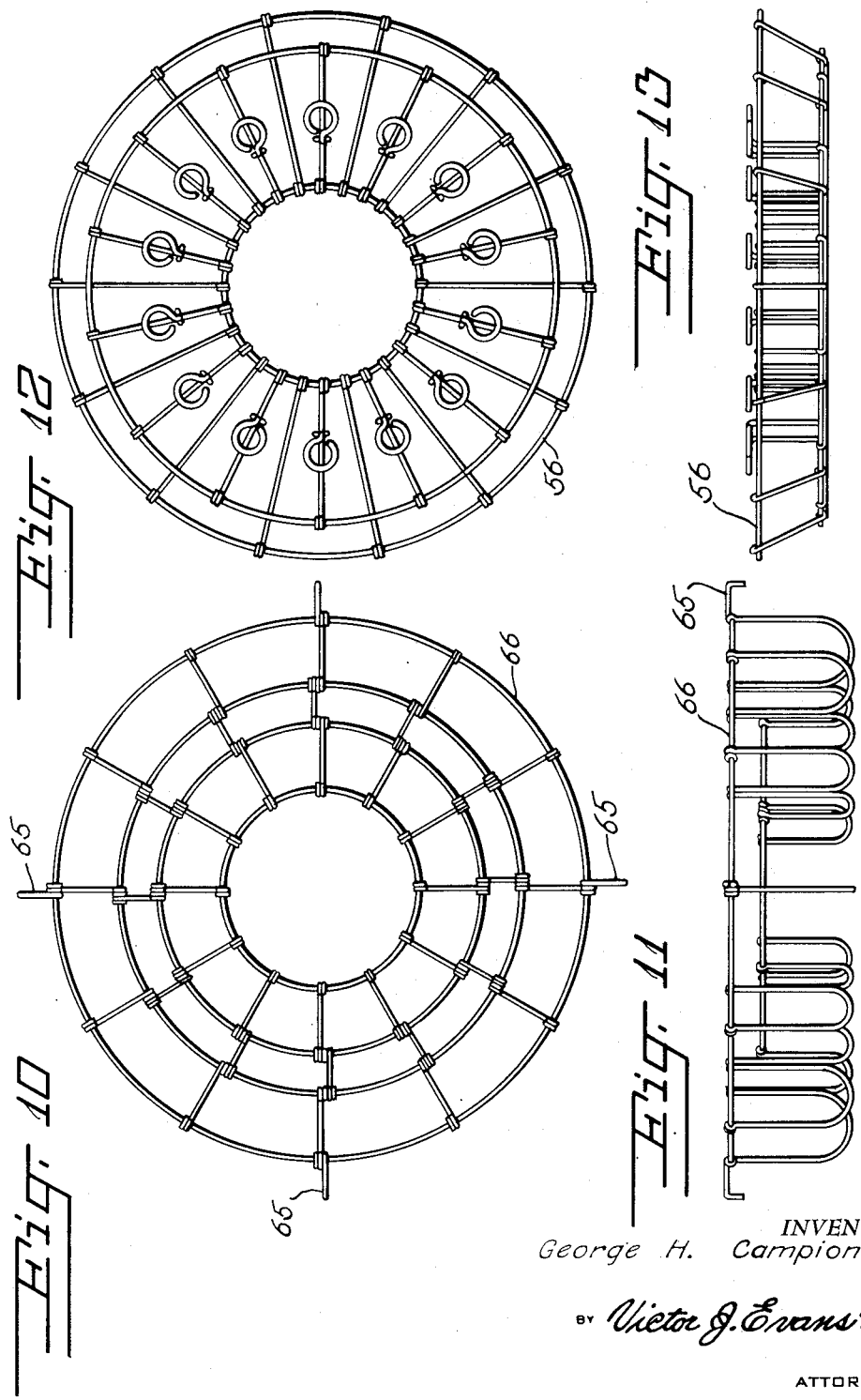

Jan. 5, 1954
G. H. CAMPION
2,664,902
CENTER SPRAY PORTABLE DISHWASHING MACHINE
Filed July 7, 1948
5 Sheets—Sheet 5
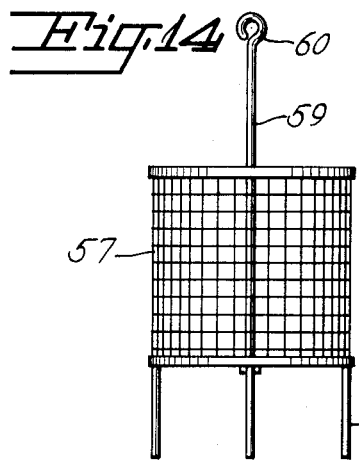
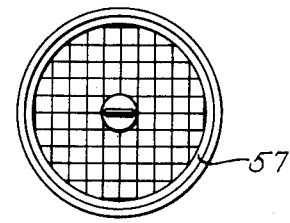
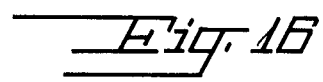
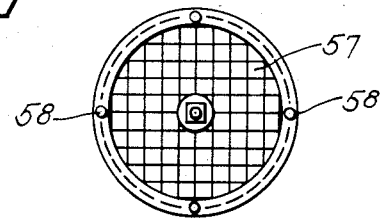
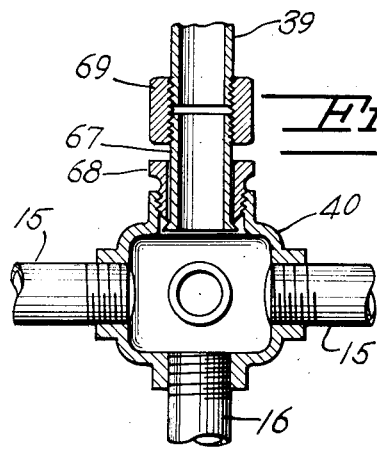
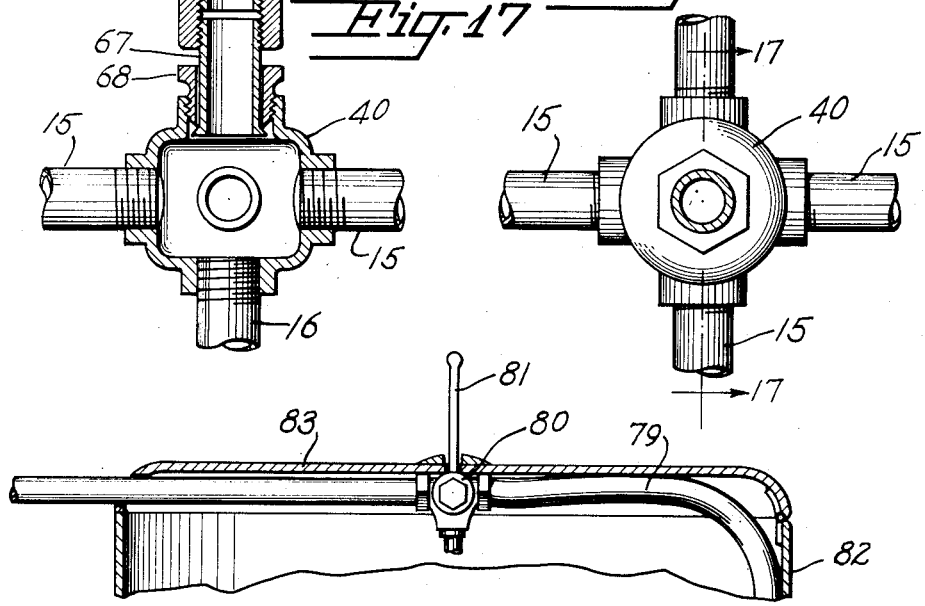
INVENTOR.
George H. Campion
BY *Victor J. Evans & Co.*
ATTORNEYS Patented Jan. 5, 1954

2,664,902

UNITED STATES PATENT OFFICE 2,664,902

CENTER SPRAY PORTABLE DISHWASHING MACHINE

George H. Campion, Abbeville, La.

Application July 7, 1948, Serial No. 37,476

1 Claim. (Cl. 134—175)

This invention relates to dishwashing machines wherein hot water containing a detergent is thoroughly sprayed over dishes, glasses, and the like in a casing, and in particular the invention includes a cylindrical outer shell or casing having a perforated circular tube in the lower part for spraying water upward, a perforated intermediate circular tube for spraying water over dishes in wire baskets in the casing, a revolving spider with a perforated vertical stem and perforated horizontally disposed arms suspended in the upper end of the casing, means for recirculating the fluid, and wire baskets for holding dishes and the like.

The purpose of this invention is to provide a dish washing machine in which water is sprayed upon the dishes from substantially all directions and in which the same elements may be used for rinsing.

In the usual machine for washing dishes and the like the water spraying elements extend into the machine and are in the way making it difficult to place dishes in and remove them from the machine. The operating instrumentalities of the usual washer are comparatively cumbersome and costly and these machines also use considerable water. With this thought in mind this invention contemplates a dish washing machine in which the casing is substantially hollow with the spray tube removed from the central part and, with the exception of the tube at the lower end, positioned against the wall, and also in which a comparatively small amount of water is recirculated until the dishes are clean.

The object of this invention is, therefore, to provide an improved dish washing machine in which the spraying elements, particularly in the intermediate portion, are located against the wall.

Another object of the invention is to provide an improved dish washing machine that may readily be converted to a rinser.

Another object of the invention is to provide an improved dish washing machine in which the same connection is used for supplying hot water to the machine and also for carrying away the waste water.

A further object of the invention is to provide an improved dish washing machine which is of a comparatively simple and economical construction.

With these and other objects and advantages in view the invention consists of the new and useful combination, construction, and arrangement of parts as hereinafter more fully described, set forth in the claims appended hereto, and disclosed in the accompanying drawings, forming part hereof, wherein:

Figure 5 is a sectional plan through the machine taken on line 5—5 of Figure 1.

Figure 10 is a plan view showing the upper plate holding basket.

Figure 11 is a view showing a side elevation of the basket shown in Figure 10.

Figure 12 is a plan view of the lower basket for holding cups, glasses and the like.

Figure 13 is a view showing a side elevation of the basket shown in Figure 12.

Figure 14 is a view showing a side elevation of a cylindrical basket that may be used in the washer.

Figure 15 is a plan view of the basket shown in Figure 14.

Figure 16 is a view looking upward toward the under side of the basket shown in Figure 14.

Figure 17 is a vertical section through the swivel connection for supporting the spider in the upper end of the washer, taken on line 17—17 of Figure 18.

Figure 18 is a plan view of the connection shown in Figure 17, taken on line 18—18 of Figure 1.

Figure 19 is a view illustrating a modification wherein a three-way valve is used in the upper end of the washer.

Figure 1:
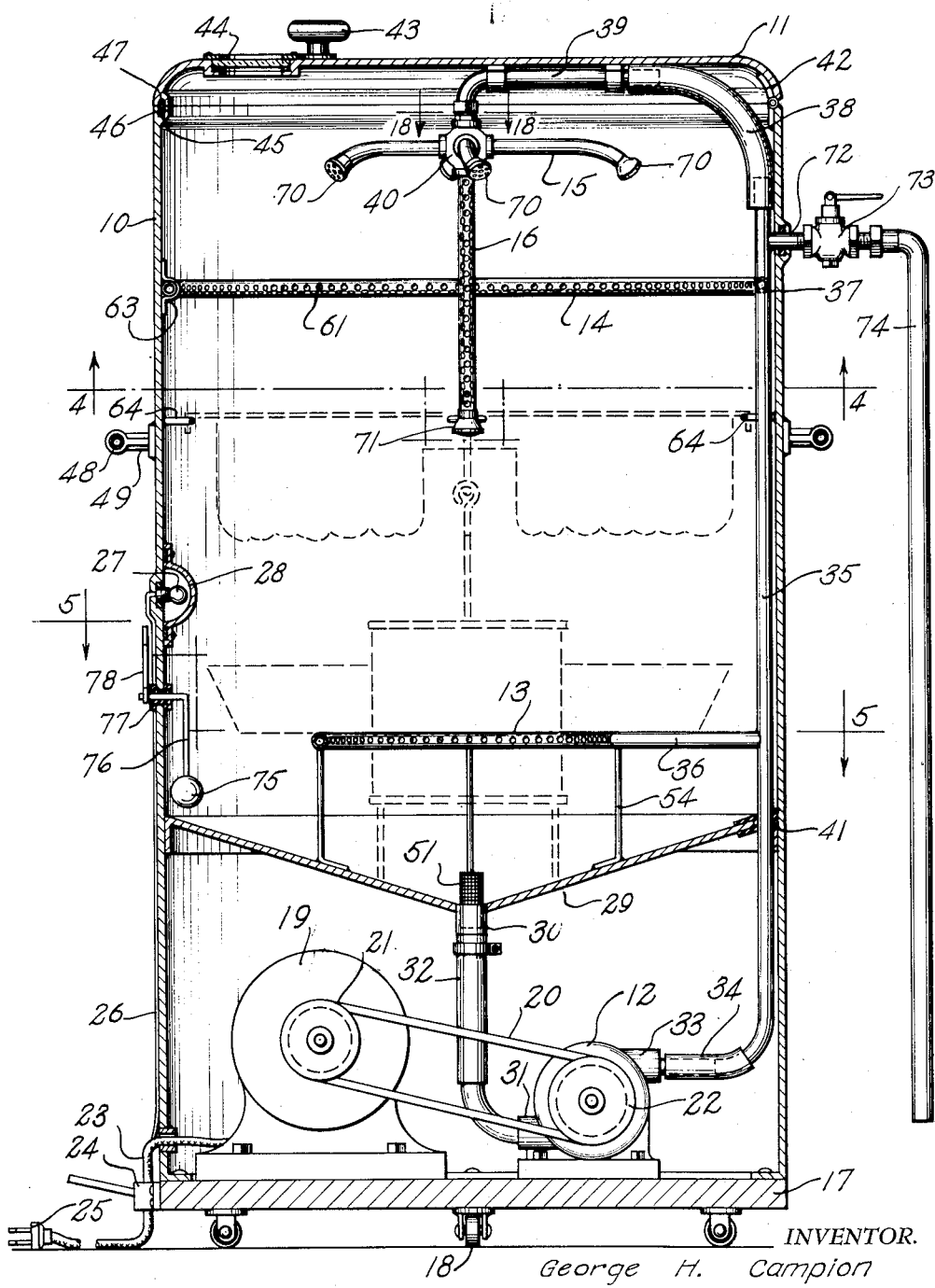
Figure 1 is a view showing a vertical section through the washer with parts shown in elevation, taken on line 1—1 of Figure 2.
Figure 2:
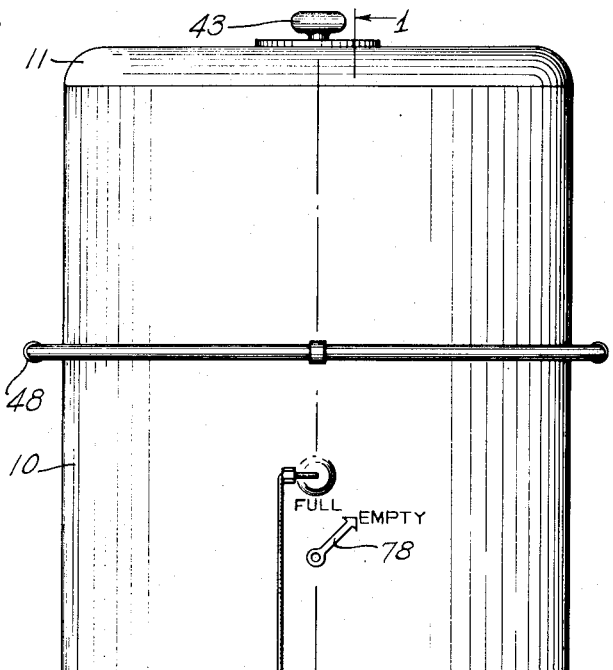
Figure 2 is a view showing a side elevation of the machine.
Figure 8:
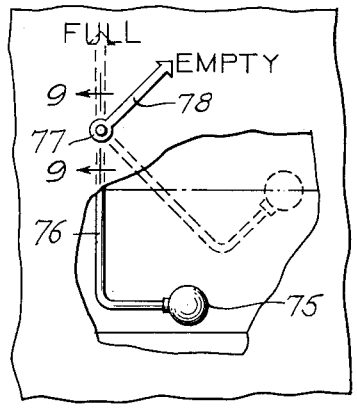
Figure 8 is a detail illustrating the liquid level indicating float with parts broken away.
Figure 3:
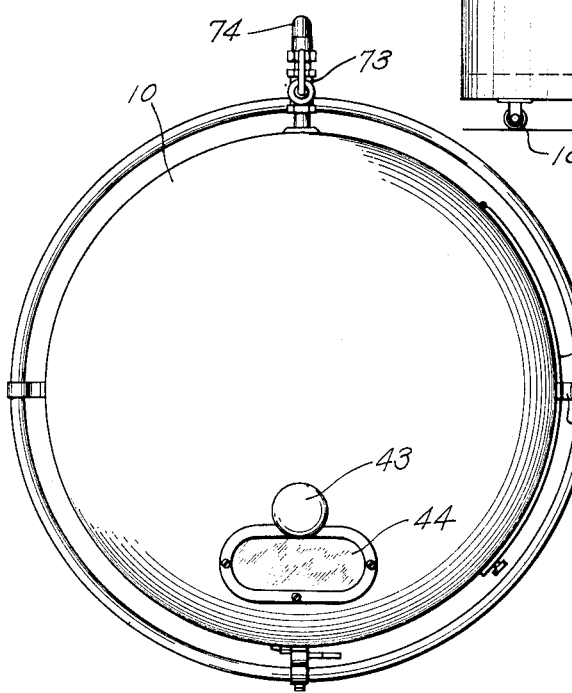
Figure 3 is a plan view of the washing machine.
Figure 9:
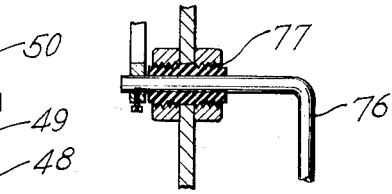
Figure 9 is a detail showing the float arm mounting, taken on line 9—9 of Figure 8.

Referring now to the drawings wherein like reference characters denote corresponding parts the improved dish washing machine of this invention includes a casing 10 having a hinged cover 11 with a recirculating pump 12, a lower perforated tube 13, an intermediate perforated tube 14, and a rotating spider having perforated arms 15 and a perforated vertical tube 16.

The casing 10 is mounted on a base 17 with casters 18 on the under surface, and the pump 12 is driven by a motor 19 through a belt 20 on pulleys 21 and 22. The pump and motor are mounted on the base 17 and the motor is provided with an electric cord 23 having a switch 24 therein and provided with a plug 25 at the end. The cord 23 is provided with an extension 26 that extends upward to a light 27 in a sealed transparent cap 28 whereby light is provided on the inside of the washer.

The casing 10 is formed with a conical-shaped false bottom 29 having a drain connection 30 in the lower end which is connected to the suction 31 of the pump 12 by a hose 32, and the discharge connection 33 of the pump is connected by a hose 34 to a vertical tube or conduit 35 that is provided with a branch connection 36 to the tube 13, a connection 37 to the tube 14, and a hose connection 38 to the rotating spider through a tube 39 on the under surface of the cover 11 and a swivel joint 40 which is illustrated in Figures 17 and 18. The vertical tube 35 passes through the false bottom 29 through a sealed washer 41.

The cover 11 is connected to the casing by a hinge 42 and the upper surface thereof is provided with a knob 43 and a window 44. The upper edge of the base is provided with a bead 45 having a packing ring 46 therein that registers with a groove 47 in a corresponding bead on the lower edge of the cover. The outer surface of the casing is provided with a continuous hand ring or handle 48 that is attached to the casing by supports 49. The casing is also provided with a clean out or repair door 50 that provides access to the motor and pump in the lower part thereof, and the drain connection in the lower end of the false bottom is provided with a strainer 51.

Figure 7:
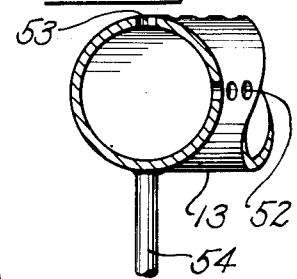
Figure 7 is a similar detail showing a section through the lower perforated tube, taken on line 7—7 of Figure 5.

The lower perforated tube 13 is formed as illustrated in Figures 5 and 7 with horizontal perforations 52 in the inner surface and vertical perforations 53 in the upper surface and this tube is supported from the false bottom 29 by posts 54. The inner surface of the tube is also provided with projecting arms 55 for supporting the lower wire basket 56. The basket 56 is positioned around the cylindrical basket 57 shown in Figures 14, 15, and 16, and the basket 57 is provided with legs 58 that rest upon the false bottom 29 and a centrally disposed stem 59 with an eye 60 at the upper end.

Figure 4:
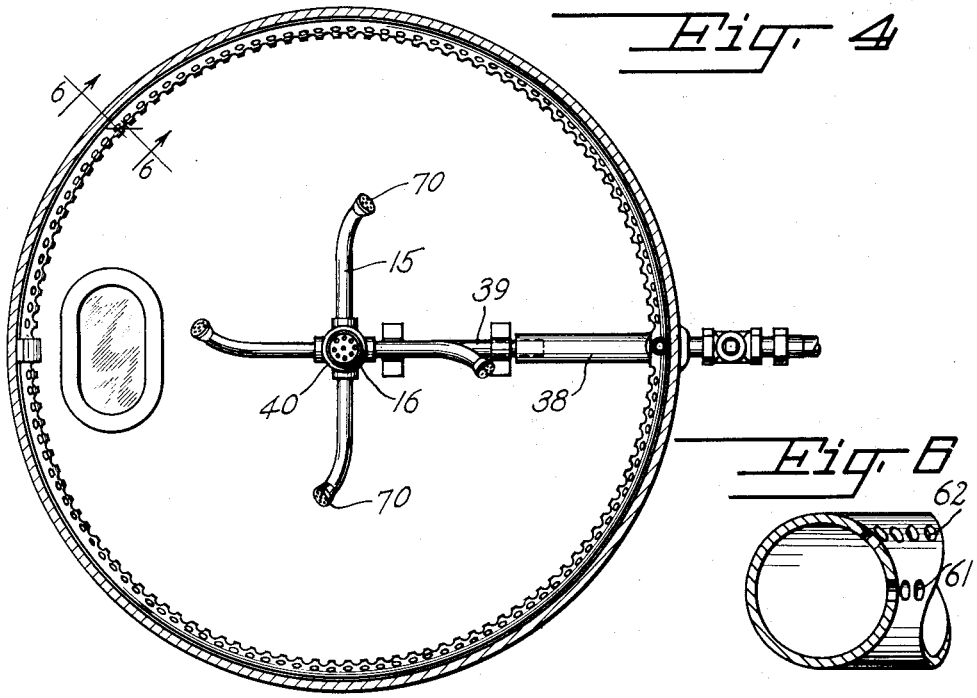
Figure 4 is a cross section through the machine looking upward, taken on line 4—4 of Figure 1.
Figure 8:
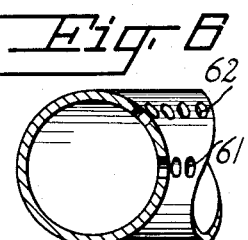
Figure 6:
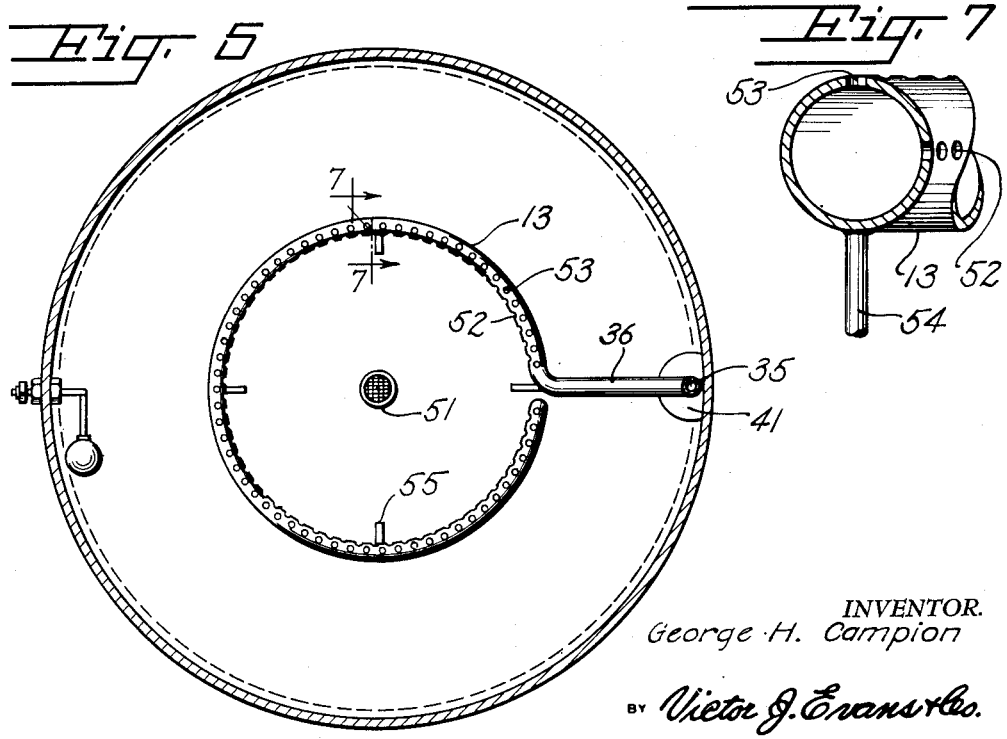
Figure 6 is a detail showing a section through the upper perforated tube, taken on line 6—6 of Figure 4.

The intermediate perforated tube 14 is formed as illustrated in Figures 4 and 6 with horizontally disposed perforations 61 in the inner surface and diagonally positioned perforations 62 also in the inner surface, and this tube is mounted on the inner wall of the casing by clips 63. The inner surface of the casing is provided with lugs 64 that are spaced below the tube 14 and positioned to receive hooks 65 on the upper plate holding basket 66, illustrated in Figures 10 and 11.

The arms 15 of the spider extend radially outward from the swivel connection 40 and the tube 16 extends vertically downward from the lower side thereof as shown in Figure 17. The casing of the swivel joint is freely held on a tube 67 by a threaded bushing 68 and the tube 67 is attached to the downwardly extending end of the tube 39 by a coupling 69. The ends of the arms 15 are provided with nozzles 70 which are turned slightly, as shown in Figure 1, and as water is sprayed therefrom the water striking the air causes the spider to rotate, turning the tube 16 also which is perforated and provided with a nozzle 71 at the lower end.

The vertical tube 35 is provided with a nipple 72 having a control valve 73 thereon, and a hose 74 extending from the opposite side of the valve may be connected to a hot water faucet when it is desired to fill the washer, or rinse the dishes, or it may extend to a drain, sink, or dishpan when it is desired to remove the fluid from the washer.

The casing is provided with a bulb 75 on an arm 76 which is pivotally mounted in a bearing 77 in the wall of the casing and a pointer 78 is provided on the outer end of the arm to indicate the water level in the casing.

In the design shown in Figure 19 a hose connection 79 at the upper end of the vertical tube extends across the upper end of the washer under the cover and the connection is provided with a three-way valve 80 with a handle 81 and this valve may be set to admit hot water to enter the washer, or to be pumped therefrom, or to be circulated within the washer, as may be desired. In this design the washer is indicated by the numeral 82 and the cover by the numeral 83.

With the parts arranged in this manner glasses, cups, small bowls, and small plates are placed in the lower rack or basket with the glasses and cups inverted over the vertical holders, knives, forks, and spoons are placed in the center basket 57, and the large plates and other dishes are placed in the upper basket. The hose is then connected to the hot water supply or faucet, and water is supplied to the washer until the indicator shows "full." A suitable detergent is then placed in the washer, the valve turned off, and the motor started. The hot water will then be sprayed over the dishes for a few minutes, and then the hose is placed in a dishpan, sink, or drain, and the valve opened. When all of the water has been exhausted, the hose is again placed on the hot water supply and fresh, clean water is placed in the washer. The motor is started again and the clean water is sprayed over the dishes for rinsing. After rinsing for a few minutes the valve is again opened and the rinse water pumped out. The cover is then opened and the dishes may remain in the washer until dry.

It will be understood that modifications may be made in the design and arrangement of the parts without departing from the spirit of the invention.

What is claimed is:

In a dishwashing machine, a base, a casing mounted on said base, a cover hingedly connected to the top of said casing, a pump supported on said base, a motor for operating said pump adapted to be connected to a source of electrical energy, caster wheels mounted below said base, a conically-shaped false bottom interposed between said cover and base, a hose connecting the central part of said bottom to the inlet of said pump, a tube supported by the under surface of said cover, a vertically-disposed conduit passing through said false bottom and connecting said tube to the outlet of said pump, a spider including perforated arms rotatably supported by said cover, a plurality of spaced parallel vertically disposed posts extending upwardly from said false bottom, a first annular horizontally disposed perforated tube supported by said posts, a branch connection connecting the first tube to said conduit, arms extending inwardly from said first tube for engagement with a basket, a second annular perforated tube arranged above said first tube, lugs extending inwardly from said casing for engaging a plate-holding basket, a nipple extending through said casing and connected to said conduit, a control valve mounted in said nipple, a hose extending from said control valve, said spider comprising a swivel connection, a plurality of arms extending outwardly from said swivel connection, a perforated tube extending downwardly from said swivel connection, nozzles arranged on the outer ends of said arms and last-named tube, a knob connected to said cover, and a window arranged in said cover.

GEORGE H. CAMPION.

References Cited in the file of this patent

UNITED STATES PATENTS

| Number | Name | Date |
|---|---|---|
| 1,162,966 | Zaninovich | Dec. 7, 1915 |
| 1,344,270 | Grozier | June 22, 1920 |
| 1,447,305 | Hauk | Mar. 6, 1923 |
| 1,624,461 | Barker | Apr. 12, 1927 |
| 1,662,818 | Brotz | Mar. 20, 1928 |
| 1,675,192 | Murdoch | June 26, 1928 |
| 2,003,003 | Marbury | May 28, 1935 |
| 2,025,592 | Kelly | Dec. 24, 1935 |
| 2,066,232 | Schmidt | Dec. 29, 1936 |
| 2,168,770 | Gunn | Aug. 8, 1939 |
| 2,238,849 | Kastberg | Apr. 15, 1941 |
| 2,330,684 | Colling | Sept. 28, 1943 |
| 2,570,021 | Beach | Oct. 2, 1951 |

FOREIGN PATENTS

| Number | Country | Date |
|---|---|---|
| 853,976 | France | Dec. 23, 1939 |
| 103,942 | Sweden | Mar. 10, 1942 |
| 588,774 | Great Britain | June 3, 1947 |
| 594,601 | Great Britain | Nov. 14, 1947 |